(12) United States Patent
Kakaraparthi

(10) Patent No.: US 10,860,355 B2
(45) Date of Patent: Dec. 8, 2020

(54) METHOD AND SYSTEM FOR MANAGING USER DENSITY AT HOST SERVER IN VIRTUAL DESKTOP INFRASTRUCTURE

(71) Applicant: Wipro Limited, Bangalore (IN)

(72) Inventor: Narasimha Sekhar Kakaraparthi, Hyderabad (IN)

(73) Assignee: Wipro Limited, Bangalore (IN)

( * ) Notice: Subject to any disclaimer, the term of this patent is extended or adjusted under 35 U.S.C. 154(b) by 298 days.

(21) Appl. No.: 15/456,878

(22) Filed: Mar. 13, 2017

(65) Prior Publication Data

US 2018/0210748 A1 Jul. 26, 2018

(30) Foreign Application Priority Data

Jan. 25, 2017 (IN) .............................. 201741002951

(51) Int. Cl.
*G06F 9/455* (2018.01)
*G06F 8/61* (2018.01)
*G06F 9/50* (2006.01)

(52) U.S. Cl.
CPC ............ *G06F 9/45558* (2013.01); *G06F 8/61* (2013.01); *G06F 9/5077* (2013.01); *G06F 2009/45562* (2013.01); *G06F 2009/45591* (2013.01)

(58) Field of Classification Search
CPC ...... G06F 9/45558; G06F 9/5077; G06F 8/61; G06F 2009/45562; G06F 2009/45591
See application file for complete search history.

(56) References Cited

U.S. PATENT DOCUMENTS

| | | | |
|---|---|---|---|
| 8,191,065 B2 | 5/2012 | Frank | |
| 8,631,405 B2 | 1/2014 | Lublin et al. | |
| 8,886,857 B2 | 11/2014 | Slutzky et al. | |
| 2006/0136701 A1* | 6/2006 | Dickinson | G06F 8/61 712/205 |
| 2011/0131589 A1* | 6/2011 | Beaty | H04L 67/10 719/318 |
| 2015/0128131 A1* | 5/2015 | Cao | G06F 9/4856 718/1 |
| 2016/0132310 A1* | 5/2016 | Koushik | G06F 8/61 717/176 |

(Continued)

*Primary Examiner* — Jung W Kim
*Assistant Examiner* — Bruce S Ashley
(74) *Attorney, Agent, or Firm* — Finnegan, Henderson, Farabow, Garrett & Dunner, LLP

(57) ABSTRACT

This disclosure relates to managing user density in a virtual desktop infrastructure. The method includes installing plurality of virtual machine agents on plurality of virtual machines and at least one hypervisor agent on at least one hypervisor host. The method includes configuring each of plurality of virtual machine agents and each of the at least one hypervisor agent to capture virtual machine management data from the plurality of virtual machines and the at least one hypervisor host. The method includes analyzing virtual machine management data to determine a plurality of sets of common applications. The method includes creating a plurality of dedicated virtual desktops and a plurality of session sharable virtual desktops. One of the plurality of sets of common applications is installed on one of the plurality of session sharable virtual desktops and at least one unique application is installed on one of the plurality of dedicated virtual desktops.

15 Claims, 6 Drawing Sheets

(56) References Cited

U.S. PATENT DOCUMENTS

2016/0134616 A1* 5/2016 Koushik ............ H04L 63/0807
            726/9
2016/0139948 A1* 5/2016 Beveridge ........... G06F 9/45558
            718/1

* cited by examiner

METHOD AND SYSTEM FOR MANAGING USER DENSITY AT HOST SERVER IN VIRTUAL DESKTOP INFRASTRUCTURE

This application claims the benefit of Indian Patent Application Serial No. 201741002951, filed Jan. 25, 2017, which is hereby incorporated by reference in its entirety.

FIELD

This disclosure relates generally to virtual desktop infrastructure and more particularly to method and system for managing user density at host server in virtual desktop infrastructure.

BACKGROUND

In a Virtual Desktop Infrastructure (VDI), virtual desktop, which is an interface, is provided to a remote user in the virtual server environment. The main objective of the virtual desktop is to separate the physical machine from the software and present the Operating System (OS) as an isolated operating machine to the user, which is stored on a hypervisor host (remote host server). One of the objective of the VDI is to save costs by sharing hardware resources and dynamically allocating them in accordance with need of remote users.

However, during virtual desktop deployments, administrators are forced to provision dedicated desktops for the users because of various reasons. These reasons may include: a user's need to install special software, user's unwillingness to forego admin rights, and user apprehension about stateless desktops. This results in bloating the disk space available at a hypervisor host, as each virtual desktop has its own copy of OS and the number of virtual desktops that can be hosted in a hypervisor host depends on resource demand (for example, type of virtual desktop, size, and nature of workload running in each virtual desktop) and resource availability (for example, compute, memory, storage size, and Input/Output Operations per Second (IOPS)) on each hypervisor host.

As a result, user density per hypervisor host (which is the ratio of total number of users serviced from the VDI site to the total number of hypervisor hosts present in that VDI site) is drastically reduced. Thus, in this scenario, with increase in the number of users, the requirement of hypervisor hosts (or remote host servers) also increases, thereby raising the infrastructure cost.

SUMMARY

In one embodiment, a method of managing user density in a virtual desktop infrastructure is disclosed. The method includes installing, by a computing device, a plurality of virtual machine agents on a plurality of virtual machines and at least one hypervisor agent on at least one hypervisor host. One of the plurality of virtual machine agents is installed on one of the plurality of virtual machines and one of the at least one hypervisor agent is installed on one of the at least one hypervisor host. The method further includes configuring, by the computing device, each of the plurality of virtual machine agents and each of the at least one hypervisor agent to capture virtual machine management data from the plurality of virtual machines and the at least one hypervisor host. Thereafter, the method includes analyzing, by the computing device, the virtual machine management data to determine a plurality of sets of common applications. Each set from the plurality of sets of common applications is common to two or more virtual machines within the plurality of virtual machines. The method further includes creating, by the computing device, a plurality of dedicated virtual desktops and a plurality of session sharable virtual desktops. One of the plurality of sets of common applications is installed on one of the plurality of session sharable virtual desktops and at least one unique application is installed on one of the plurality of dedicated virtual desktops.

In another embodiment, a system for managing user density in a virtual desktop infrastructure is disclosed. The system includes a processor; and a memory communicatively coupled to the processor. The memory stores processor instructions, which, on execution, causes the processor to install a plurality of virtual machine agents on a plurality of virtual machines and at least one hypervisor agent on at least one hypervisor host. One of the plurality of virtual machine agents is installed on one of the plurality of virtual machines and one of the at least one hypervisor agent is installed on one of the at least one hypervisor host. The processor instructions further cause the processor to configure each of the plurality of virtual machine agents and each of the at least one hypervisor agent to capture virtual machine management data from the plurality of virtual machines and the at least one hypervisor host. The processor instructions further cause the processor to analyze the virtual machine management data to determine a plurality of sets of common applications. Each set from the plurality of sets of common applications is common to two or more virtual machines within the plurality of virtual machines. The processor instructions cause the processor to create a plurality of dedicated virtual desktops and a plurality of session sharable virtual desktops. One of the plurality of sets of common applications is installed on one of the plurality of session sharable virtual desktops and at least one unique application is installed on one of the plurality of dedicated virtual desktops.

In yet another embodiment, a non-transitory computer-readable storage medium is disclosed. The non-transitory computer-readable storage medium has instructions stored thereon, a set of computer-executable instructions causing a computer comprising one or more processors to perform steps that include installing, by a computing device, a plurality of virtual machine agents on a plurality of virtual machines and at least one hypervisor agent on at least one hypervisor host. One of the plurality of virtual machine agents is installed on one of the plurality of virtual machines and one of the at least one hypervisor agent is installed on one of the at least one hypervisor host. The steps further include configuring, by the computing device, each of the plurality of virtual machine agents and each of the at least one hypervisor agent to capture virtual machine management data from the plurality of virtual machines and the at least one hypervisor host. The steps include analyzing, by the computing device, the virtual machine management data to determine a plurality of sets of common applications. Each set from the plurality of sets of common applications is common to two or more virtual machines within the plurality of virtual machines. The steps further include creating, by the computing device, a plurality of dedicated virtual desktops and a plurality of session sharable virtual desktops. One of the plurality of sets of common applications is installed on one of the plurality of session sharable virtual desktops and at least one unique application is installed on one of the plurality of dedicated virtual desktops.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
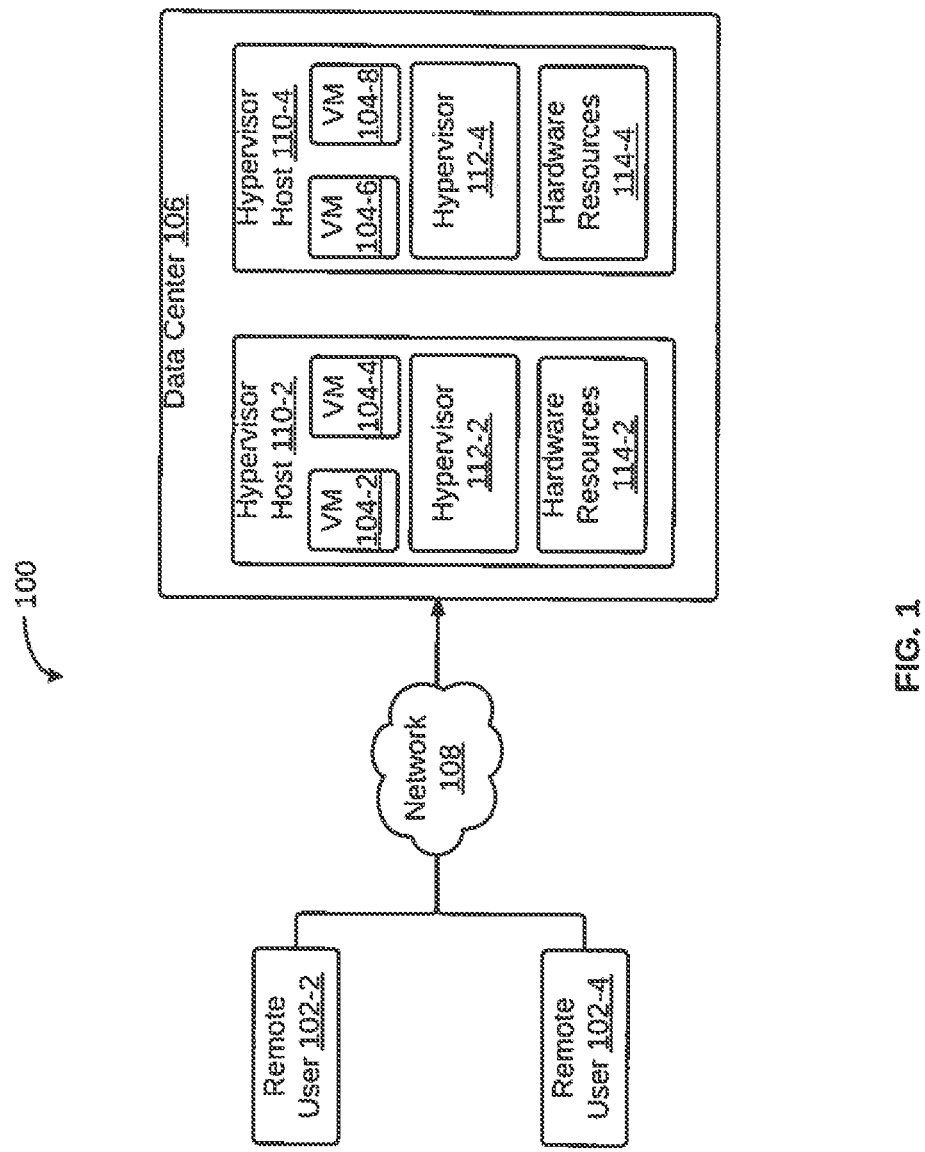
FIG. 1 illustrates a virtual desktop infrastructure in which various embodiments may function.

Additional illustrative embodiments are listed below. In one embodiment, a virtual desktop infrastructure 100 in which various embodiments may function is illustrated in FIG. 1. Virtual desktop infrastructure 100 includes a plurality of remote users (for example, a remote user 102-2 and a remote user 102-4) that access a plurality of virtual machines (for example, a virtual machine 104-2, a virtual machine 104-4, a virtual machine 104-6, and a virtual machine 104-8, referred to respectively as, VM 104-2, VM 104-4, VM 104-6, and VM 104-8 in FIG. 1) located in a data center 106 through a network 108, which may be wired or wireless. The plurality of remote users may access one or more of the plurality of virtual machines either through a web browser or an application installed on a computing device. Examples of the computing device may include, but are not limited to a laptop, a desktop, a mobile device, a smart phone, a tablet, and a phablet. Each of the plurality of virtual machines are an abstraction of a physical computer system and includes an Operating System (OS) (referred to as the "guest OS") and applications (referred to as "guest applications.")

Virtual machines 104-2 and 104-4 are installed on a hypervisor host 110-2 and virtual machines 104-6 and 104-8 are installed on a hypervisor host 110-4 within data center 106. A hypervisor host may be a host server within data center 108. It will be apparent to a person skilled in the art that data center 106 may include more than two hypervisor hosts and each hypervisor host may include more than two virtual machines. In addition to virtual machines, each hypervisor host includes a hypervisor and hardware resources. Hypervisor host 110-2 includes a hypervisor 112-2 and hardware resources 114-2 and hypervisor host 110-4 includes a hypervisor 112-4 and hardware resources 114-4.

Each of hypervisor 112-2 and 112-4 is a hardware virtualization software that allows multiple guest OS to run on a single hypervisor host, i.e., hypervisor host 110-2 and hypervisor host 110-4, at the same time in the form of virtual machines. Hardware resources of a hypervisor host may include, but are not limited to one or more processors, non-volatile or volatile memory (for example, Random Access Memory (RAM)), and a Network Interface Port (NIC). The guest OS associated with a virtual machine shares hardware resources of the hypervisor host with guest OS of other virtual machines installed on the same hypervisor host. As a result, each guest OS appears to have its own processor, memory, and other hardware resources. By way of an example, in hypervisor host 110-2, hypervisor 112-2 enables virtual machine 104-2 and virtual machine 104-4 to share hardware resources 114-2 in order to have two separate guest OSs on the same machine.

When a session is established between a remote user and a virtual machine, the virtual machine provides an associated virtual desktop to the remote user on a computing device used by the remote user. By way of an example, remote user 102-2 establishes a session with virtual machine 104-2, which provides an associated virtual desktop on a computing device of remote user 102-2. The virtual desktop is an interactive user environment provided by a guest OS and applications running within the virtual machine. The virtual desktop also accepts input from the remote user in the form of device inputs, such as, keyboard and mouse inputs.

Figure 2:
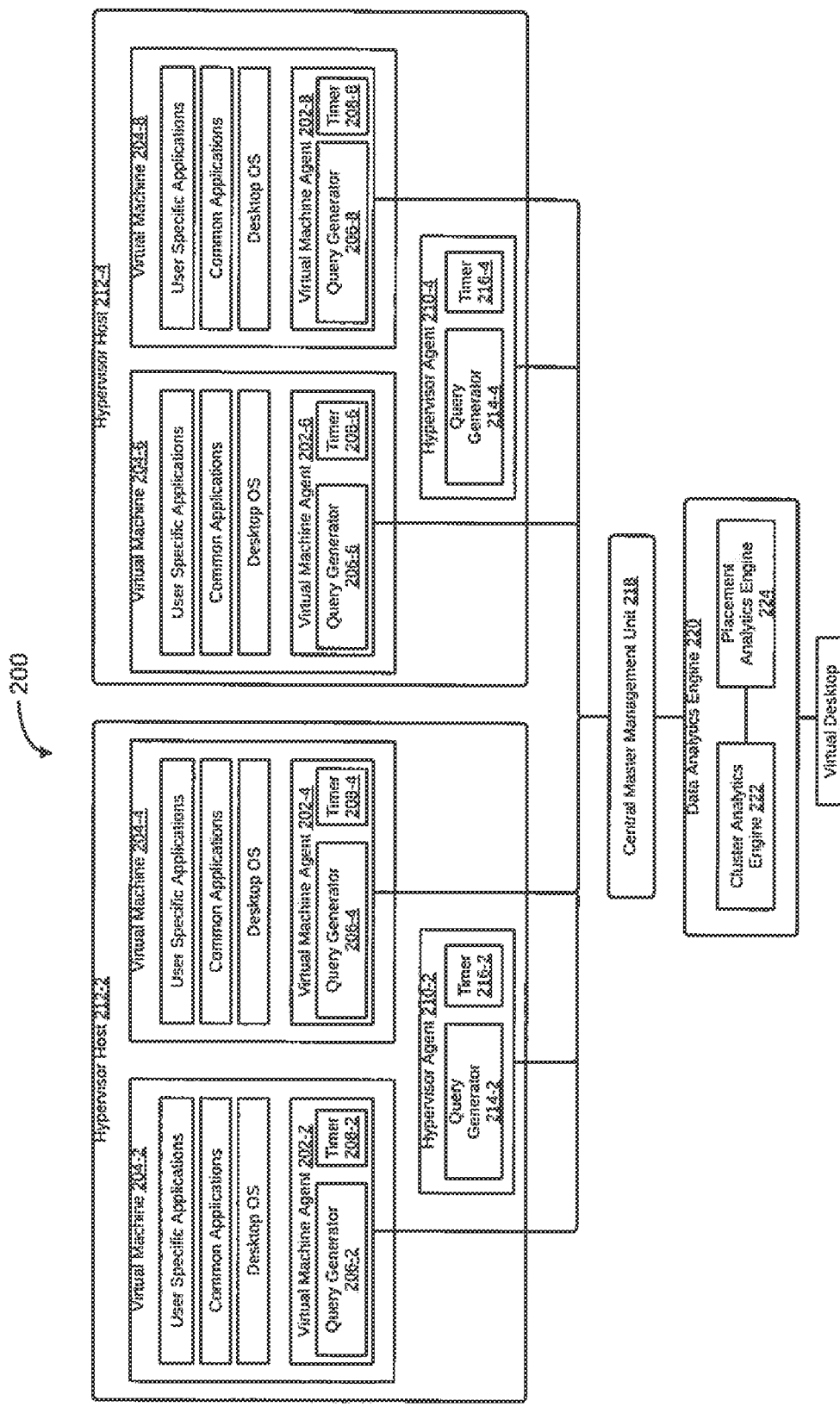
FIG. 2 is a block diagram illustrating a system for managing user density in a virtual desktop infrastructure, in accordance with an embodiment.

Referring now to FIG. 2, a block diagram illustrating a system 200 for managing user density in a virtual desktop infrastructure, in accordance with an embodiment. System 200 includes a plurality of virtual machine agents (for example, a virtual machine agent 202-2, a virtual machine agent 202-4, a virtual machine agent 202-6, and a virtual machine agent 202-8) installed on a plurality of virtual machines 204 (for example, a virtual machine 204-2, a virtual machine 204-4, a virtual machine 204-6, and a virtual machine 204-8). Each of the plurality of virtual machine agents is configured to capture virtual machine management data for a virtual machine, it is installed on. By way of an example, virtual machine agent 202-2 captures virtual machine management data for virtual machine 204-2 and virtual machine agent 202-4 captures virtual machine management data for virtual machine 204-4. By way of another example, virtual machine agent 202-6 captures virtual machine management data for virtual machine 204-6 and virtual machine agent 202-8 captures virtual machine management data for virtual machine 204-8.

Virtual machine management data captured for a virtual machine may include, but is not limited to static and dynamic information associated with applications installed on that virtual machine, users of that virtual machines, and desktop specific data associated with that virtual machine. The static information associated with the applications installed may include, but is not limited to list of applications installed on each of the plurality of virtual machines, name of each application, application version, any user specific customization done, application type, data security level preferences, compatible computing resources, customized user settings, and data retention preferences. Dynamic information associated with the applications may include load characteristics at different times, computation capacity (at average or peak load conditions), memory usage, storage resources consumed, and resource utilization data that includes the memory, storage size, Input/Output Operations per Second (IOPS) associated with an application, and amount of time it takes to perform particular process.

Information associated with users of that virtual machine may include, but is not limited to volume of resources requested by user during user session, amount of application accessed by user, user identifier, average length of time per session, usage frequency, user start time, user end time and privacy preference. Further, information associated with desktop specific data may include, but is not limited to maximum and minimum Central Processing Unit (CPU) and Random Access Memory (RAM) utilization, I/O bandwidth, storage utilization, storage latency, type of guest operating system (or server operating system), type of virtual desktops (dedicated virtual desktop or session shared virtual desktop), number of shared session users, network flow information between users such as minimum and maximum bandwidth, network latency, network collisions, and dropped packets.

To capture the virtual machine management data, the plurality of virtual machine agents includes a plurality of query generators (for example, query generators 206-2, 206-4, 206-6, and 206-8) and a plurality of timers (for example, timers 208-2, 208-4, 208-6, and 208-8), which are respectively sent a virtual machine agent data collection template and a schedule to capture the virtual machine management data. Based on the virtual machine agent data collection template, a query generator generates the query to collect static and dynamic information regarding the virtual machine management data. The query may be generated periodically based on the schedule received by a timer in communication with the query generator within a virtual machine agent. By way of an example, query generator 206-2 collects virtual machine management data associated with virtual machine 204-2 based on a data collection template received specifically for virtual machine agent 202-2. The periodicity of collecting the virtual machine management data is determined based on a data collection schedule received by a timer 208-2 within virtual machine agent 202-2.

In a manner similar to installing the plurality of virtual machine agents, system 200 includes a plurality of hypervisor agents that are installed on a plurality of hypervisor hosts (for example, a hypervisor agent 210-2 is installed on a hypervisor host 212-2 and a hypervisor agent 210-4 is installed on a hypervisor host 212-4). Each of the plurality of hypervisor agents collect virtual machine management data associated with one of the plurality of hypervisor hosts, it is installed on. By way of an example, hypervisor agent 210-2 collects virtual machine management data associated with hypervisor host 212-2 and hypervisor agent 210-4 collects virtual machine management data associated with hypervisor host 212-4. Virtual machine management data includes static and dynamic information associated with each of the plurality of hypervisor host.

Virtual machine management data captured for a hypervisor host may include, but is not limited to disk storage capacity, processing capacity, I/O capacity, number of virtual machines provisioned, types of virtual desktop provisioned, disk usage statistics, average load statistics, throughput statistics, statistics regarding usage of computing resources at any one period of time, availability of computing system resources at any period of time, crash prone probability. The virtual machine management data may include also application estate, usage, and nature of IOPS.

In order to collect the virtual machine management data from the plurality of hypervisor hosts, the plurality of hypervisor agents include a plurality of query generators (for example, query generators 214-2 and 214-4) and a plurality of timers (for example, timers 216-2 and 216-4), which are respectively sent a hypervisor agent data collection template and schedule. Based on the hypervisor agent data collection template, a query generator generates the query to collect static and dynamic information regarding virtual machine management data. The query may be generated periodically based on the schedule received by a timer in communication with the query generator within a hypervisor agent. By way of an example, query generator 214-2 collects virtual machine management data associated with hypervisor host 212-2 based on a data collection templated received specifically for hypervisor agent 210-2. The periodicity of collecting the virtual machine management data is determined based on a data collection schedule received by timer 216-2 within hypervisor agent 210-2.

The virtual machine agent data collection templates and schedules and the hypervisor agent data collection templates and schedules, are provided by a central master management unit 218. The virtual machine management data captured by the plurality of virtual machine agents and the plurality of hypervisor agents is thus communicated back to central master management unit 218, which is also configured to retrieve and subsequently store the virtual machine management data. The virtual machine agent data collection templates are different from the hypervisor agent data collection templates. Even the virtual machine agent data collection templates may also be different based on operating system running inside respective virtual machines. As a result of central master management unit 218, the plurality of virtual machine agents and the plurality of hypervisor agents are not required to interact amongst each other.

Central master management unit 218 further communicates the captured virtual machine management data to a data analytics engine 220 that includes a cluster analytics engine 222 and a placement analytics engine 224. Cluster analytics engine 222 analyzes the virtual machine management data to determine a plurality of sets of common applications. Each set from the plurality of sets of common applications is common to two or more virtual machines within the plurality of virtual machines. In other words, common applications across the plurality of virtual machines are organized into multiple clusters, such that, each cluster includes two or more common applications.

In order to determine the plurality of sets of common applications, cluster analytics engine 222 extracts similarity patterns and compatibility patterns from the virtual machine management data. The similarity patterns and the compatibility patterns may be extracted using a segmented search algorithm or a statistical classification algorithm. Examples of similarity patterns may include, but are not limited to same application, different versions of same application, same type of applications (Browser based or standalone). Further, examples of compatibility patterns may include, but are not limited to applications having similar resource demands (i.e., compute, storage, network), applications that require graphical processors, applications having same dependencies such as database or enterprise services.

In an embodiment, data analytics engine 220 first detects discrepancies in the virtual machine management data and prepares a sorted and grouped application. Thereafter, cluster analytics engine 222 fine-tunes the grouped application list to identify the common applications based on usage and customization and personal resource requirement for each of these applications. While determining common applications, different versions of same application may be consolidated by choosing latest version and providing the latest version. Resource usages for these applications may be collected at different times so that average and peak resource consumptions may be accurately determined for a precise identification of common applications.

Thereafter, cluster analytics engine 222 creates a plurality of dedicated virtual desktops and a plurality of session sharable virtual desktops. One of the plurality of sets of common applications is installed on one of the plurality of session sharable virtual desktops and unique applications are installed separately on one of the plurality of dedicated virtual desktops. The dynamic data collected for applications (i.e., peak and average resource demands) is essential to finalize machine requirements for the server OS to install the plurality of session sharable virtual desktops. By way of an example, seven applications, i.e., A, B, C, D, E, F, and G are used by three virtual machines, i.e., virtual machine 204-2, virtual machine 204-4, and virtual machine 204-6. Based on analysis of virtual machine management data, cluster analytics engine 222 may determine that two application A and B are common across virtual machines 204-2 and 204-4 and the applications F and G are common across virtual machines 204-4 and 204-6. The applications C, D, and E, are respectively unique to virtual machines 204-2, 204-4, and 204-6. Thus, two session shareable virtual desktops may be created to install the common set of applications, i.e., applications (A and B) on one session shareable virtual desktop and applications (F and G) on another session shareable virtual desktop. For the three unique applications, i.e., applications C, D, and E, three separate dedicated virtual desktops are created to separately install these applications. This is further explained in conjunction with an exemplary embodiment given in FIG. 5.

By installing common applications on session sharable virtual desktops, a single application instance is shared by multiple users and application icons for these shared application instances may be created on user desktops to facilitate session sharing. As a result, the application memory, disk space as well the IOPS are consolidated. When a user of a virtual desktop clicks on an application icon, a session will be created to shared application running on server OS machine. Each user session runs in separate user context and isolated from other user. But the resource consumed by application (compute, memory, and storage) are shared. As a result, resources are consolidated, while still maintaining user isolation.

Once the plurality of dedicated virtual desktops and the plurality of session sharable virtual desktops have been created, placement analytics engine 224 determines similarity patterns and compatibility patterns existing between the plurality of hypervisor hosts, the plurality of dedicated virtual desktops, and the plurality of session shareable virtual desktops. The similarity patterns and compatibility patterns enable placement analytics engine 224 to place the plurality of dedicated virtual desktops and the plurality of session shareable virtual desktops on one or more of the plurality of hypervisor hosts. Examples of similarity patterns may include virtual desktops requiring special hardware support, such as, a General Processing Unit (GPU). Examples of compatibility patterns may include virtual desktop types (such as, pooled or dedicated) and desktop provision mechanisms.

Thereafter, a virtual desktop provisioning engine 226 that is coupled to data analytics engine 220 re-provisions the plurality of virtual machines based on placement of the plurality of dedicated virtual desktops and the plurality of session shareable virtual desktops on one or more of the plurality of hypervisor hosts, with reduction in per host user density in the virtual desktop infrastructure. This results in virtual machines that are stateless to a great extent without user apprehension.

As the common applications are shifted to session sharable virtual desktop (shared OS server), only dedicated or unique applications are left in user's dedicated virtual desktops images. A single application instance, installed on session sharable virtual desktop is shared by multiple users. Thus, the application memory, disk space as well the IOPS are consolidated. This leads to reduction in the total resources required by the site users. As the resource requirement are reduced considerably, more virtual desktops can be accommodated in the site without increasing the hypervisor host count, thereby increasing user density served by a hypervisor host. This further leads to reduction in number of hypervisor hosts and cost optimization due to reduced hardware and software license cost. Moreover, as the method is completely automated, it is very fast and efficient.

Figure 3:
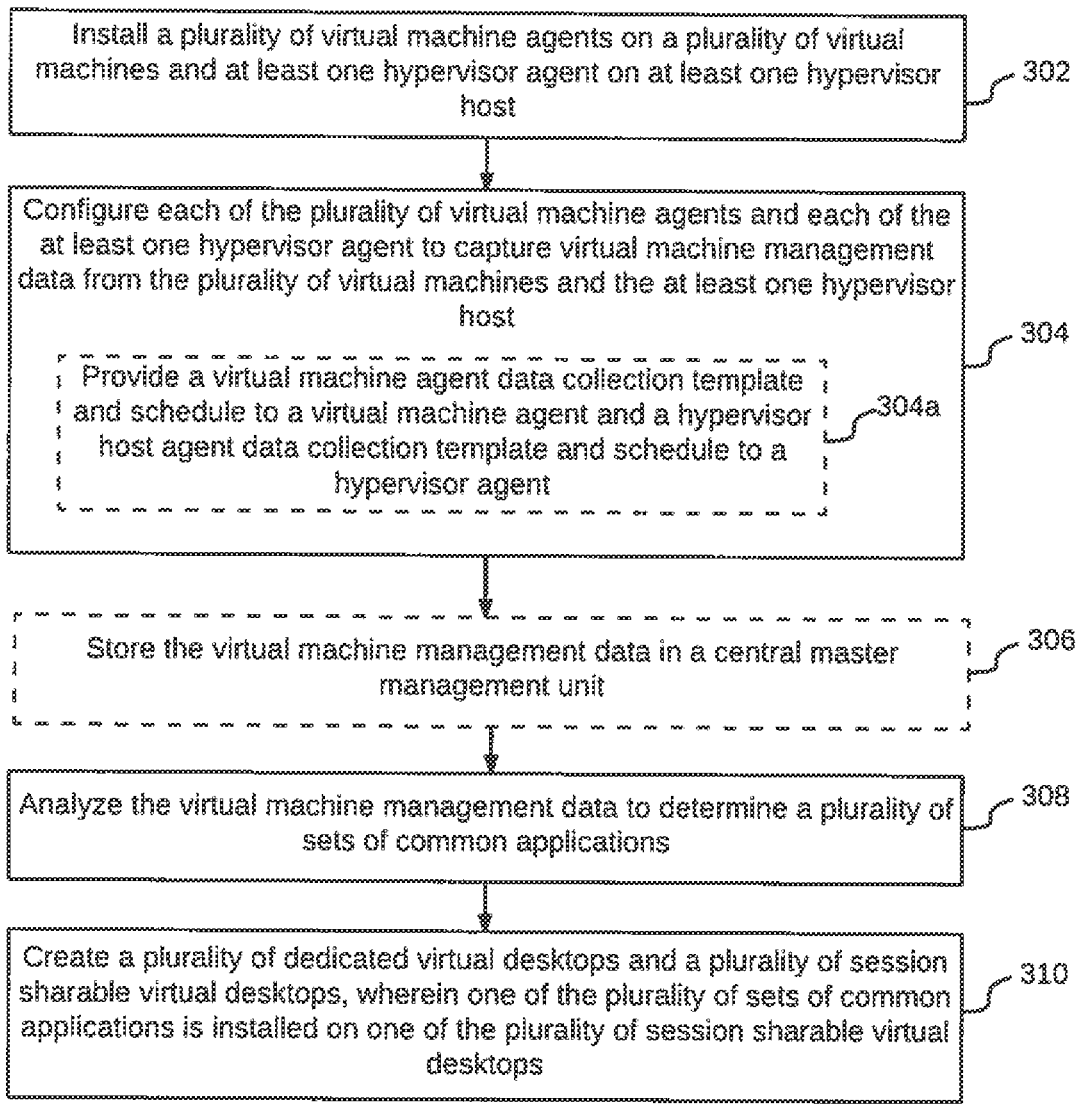
FIG. 3 illustrates a flowchart of a method for managing user density in a virtual desktop infrastructure, in accordance with an embodiment.

Referring now to FIG. 3, a flowchart of a method for managing user density in a virtual desktop infrastructure is illustrated, in accordance with an embodiment. At 302, a computing device installs a plurality of virtual machine agents on a plurality of virtual machines and one or more hypervisor agents on one or more hypervisor hosts. By way of an example, virtual machine agent 202-2 is installed on virtual machine 204-2 and hypervisor agent 210-2 is installed on hypervisor host 212-2. The computing device may include system 200 discussed above in FIG. 2. Alternatively, the computing device may be one of the one or more hypervisor hosts.

Thereafter, at 304, the computing device configures each of the plurality of virtual machine agents and each of the one or more hypervisor agents to capture virtual machine management data from the plurality of virtual machines and the one more hypervisor hosts. Different types of virtual machine management data have been described in detail in FIG. 2. To enable capturing of the virtual machine management data from a virtual machine, a virtual machine agent installed on the virtual machine includes a query generator and a timer. By way of an example, virtual machine agent 202-2 includes query generator 206-2 and timer 208-2 to capture virtual machine management data associated with virtual machine 204-2. To enable capturing of the virtual machine management data from a hypervisor host, a hypervisor agent installed on the hypervisor host includes a query generator and a timer. By way of an example, hypervisor agent 210-2 includes query generator 214-2 and timer 216-2 to capture virtual machine management data associated with hypervisor host 212-2.

To configure each of the plurality of virtual machine agents and each of the one or more hypervisor agents, the computing device, at 304a, provides a virtual machine agent data collection template and schedule to each virtual machine agent and a hypervisor agent data collection template and schedule to each hypervisor agent. This has been explained in detail in conjunction with FIG. 2. In an exemplary embodiment, a virtual machine agent data collection template and the virtual machine management data subsequently captured by virtual machine agents installed on two virtual machines, i.e., VM 1 and VM 2, is illustrated in Table 1 given below. In this case, the virtual machine agent data collection template shared with both virtual machines is the same:

TABLE 1

| Virtual Machine | Application (App) | Version | Customization | Type | Load Characteristics (Average, Peak) | | |
|---|---|---|---|---|---|---|---|
| | | | | | Compute | Memory | Storage (Size, IOPS) |
| VM 1 | App1 | V1.5 | No | Standalone | 40%, 60% | 1 GB, 3 GB | 20 GB, 10, 60 |
| VM1 | App2 | V1.2 | No | Browser | 20%, 60% | 2 GB, 3 GB | 20 GB, 20, 80 |
| VM1 | App3 | V1.4 | No | Standalone | 30%, 60% | 1.3 GB, 4 GB | 20 GB, 5, 120 |
| VM2 | App1 | V1.5 | No | Standalone | 40%, 80% | 1 GB, 4 GB | 20 GB, 14, 70 |

Table 1 includes a list of applications installed on VM1 and VM2 and details associated with each of these applications. The details collected by the virtual machines agents include both static and dynamic information about each of these applications. Static information includes application name, version, any user specific customization done, application type. The details regarding customization enable data analytics engine 220 to decide where to push an application, when it is being installed on a shared virtual machine. Dynamic information includes the load characteristics at different times. The load characteristics includes compute capacity (at average, peak load conditions), memory usage, and storage resources consumed. The dynamic information regarding load characteristics are collected at different times so that average and peak resource consumptions can be determined. In a similar manner, aggregated resource usage at host level may be collected from hypervisor agents.

At 306, the computing device may store the virtual machine management data in central master management unit 218. The computing device then analyzes, at 308, the virtual machine management data to determine a plurality of sets of common applications. Each set from the plurality of sets of common applications is common to two or more virtual machines within the plurality of virtual machines. Thereafter, at 310, the computing device creates a plurality of dedicated virtual desktops and a plurality of session sharable virtual desktops. One of the plurality of sets of common applications is installed on one of the plurality of session sharable virtual desktops and unique applications are installed on one of the plurality of dedicated virtual desktops. This has been explained before in conjunction with FIG. 2.

Figure 4:
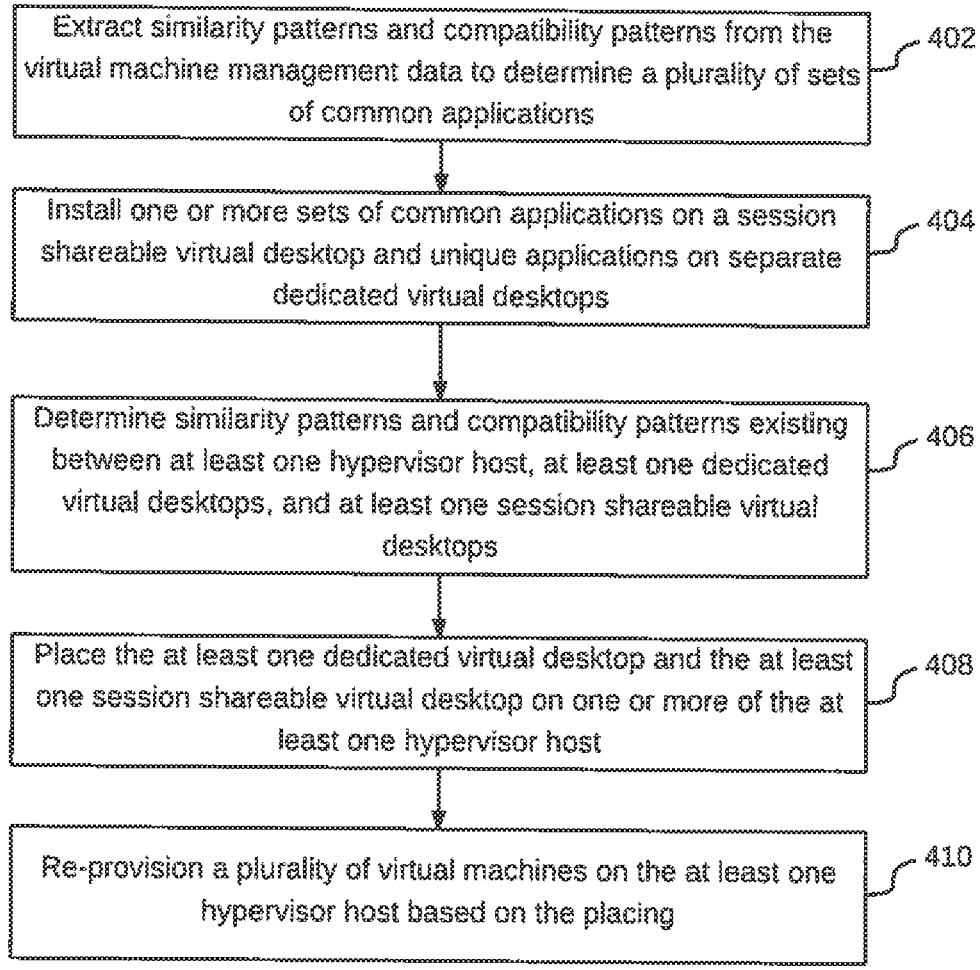
FIG. 4 illustrates a flowchart of a method for managing user density in a virtual desktop infrastructure, in accordance with another embodiment.

Referring now to FIG. 4, a flowchart of a method for managing user density in a virtual desktop infrastructure is illustrated, in accordance with another embodiment. At 402, similarity patterns and compatibility patterns are extracted from the virtual machine management data captured by virtual machine agents installed on virtual machines and hypervisor agents installed on hypervisor hosts. The similarity patterns and the compatibility patterns may be extracted using a segmented search algorithm or a statistical classification algorithm. Examples of similarity patterns may include, but are not limited to same application, different versions of same application, same type of applications (Browser based or standalone). Further, examples of compatibility patterns may include, but are not limited to applications having similar resource demands (i.e., compute, storage, network), applications that require graphical processors, applications having same dependencies such as database or enterprise services.

Thereafter, one or more dedicated virtual desktops and one or more session sharable virtual desktops are created. At 404, one or more sets of common applications are installed on a session shareable virtual desktop and unique applications are installed on separate dedicated virtual desktops. This has been explained in detail in conjunction with FIG. 2 and FIG. 3. At 406, similarity patterns and compatibility patterns existing between one or more hypervisor hosts, one or more dedicated virtual desktops, and one or more session shareable virtual desktops is determined. Based on this determination, at 408, the one or more dedicated virtual desktop and the one or more session shareable virtual desktops are placed on one or more hypervisor hosts. Thereafter, at 410, a plurality of virtual machines is re-provisioned on the one or more hypervisor hosts based on the placing of the one or more dedicated virtual desktops and the one or more session shareable virtual desktops. This results in reduction in per host user density in the virtual desktop infrastructure and in virtual machines that are stateless to a great extent without user apprehension. This has been explained in detail in conjunction with FIG. 2 and FIG. 3.

Figure 5:
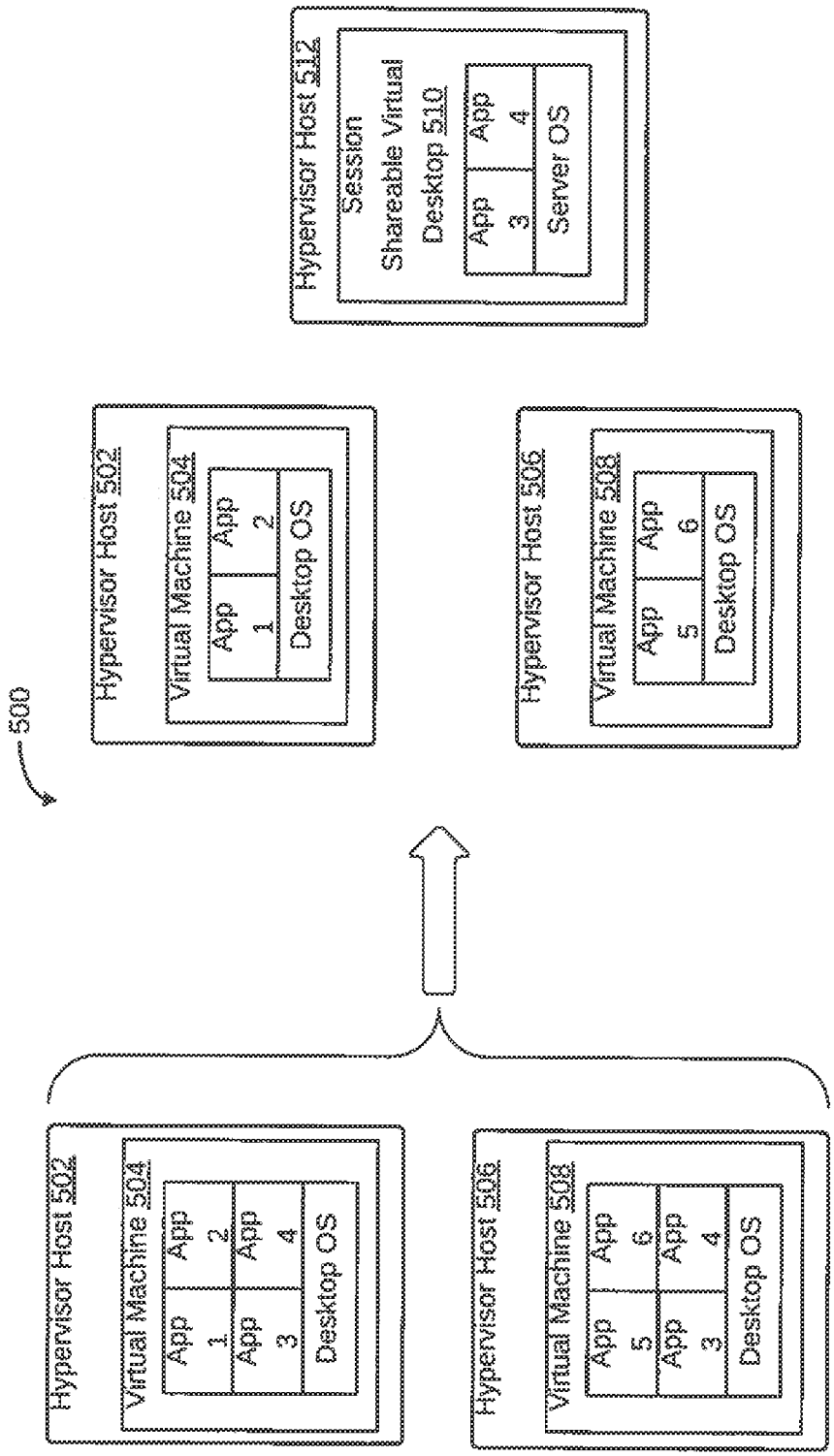
FIG. 5 illustrates a virtual desktop infrastructure depicting shifting of common applications to a session shareable virtual desktop and installing unique applications on dedicated virtual desktops, in accordance with an exemplary embodiment.

Referring now to FIG. 5, a virtual desktop infrastructure 500 depicting shifting of common applications to a session shareable virtual desktop and installing unique applications on dedicated virtual desktop is illustrated, in accordance with an exemplary embodiment. Virtual desktop infrastructure 500 includes a hypervisor host 502 that includes a virtual machine 504 and a hypervisor host 506 that included a virtual machine 508. Virtual machine 504 has the following applications installed along with a desktop OS: Application-1, Application-2, Application-3, and Application-4 (referred to as App-1, App-2, App-3, and App-4 in FIG. 5) and virtual machine 508 has the following applications installed along with a desktop OS: Application-3, Application-4, Application-5, and Application-6 (referred to as App-3, App-4, App-5, and App-6 in FIG. 5).

The virtual machine agents (not shown in FIG. 5) installed on virtual machines 504 and 508 and hypervisor agents (not shown in FIG. 5) installed on hypervisor hosts 502 and 506, capture the virtual machine management data associated with hypervisor hosts 502 and 506, virtual machines 504 and 508, and all the applications installed on virtual machines 504 and 508. Data analytics engine 220 then analyses the captured virtual machine management data (as described in FIGS. 2, 3, and 4) to determine the applications that are common across virtual machines 504 and 508.

Based on the analysis, cluster analytics engine 222 determines that Application-3 and Application-4 are common across virtual machines 504 and 508, and Application-1 and Application-2 are unique to virtual machine 504, while Application-5 and Application-6 are unique to virtual machine 508. Thus, cluster analytics engine 222 creates a session shareable virtual desktop 510 and installs Application-3 and Application-4 on a server OS, while application icons are created on user desktops associated with virtual machines 504 and 508. When a user of virtual machine 504 or virtual machine 508 clicks on an application icon, a session is created to one of the Application-3 or Application-4 running on the server OS. Each user session runs in separate user context, isolated from other user and the resource consumed by Application-3 and Application-4 (i.e., compute, memory, and storage) are shared. Thus, resources are consolidated, while still maintaining user isolation.

Cluster analytics engine 222 also creates a dedicated virtual desktop associated with virtual machine 504 for installing Application-1 and Application-2 and another dedicated virtual desktop associated with virtual machine 508 for installing Application-5 and Application-6. Thereafter, placement analytics engine 224 determines a similarity pattern and compatibility patterns existing between a plurality of hypervisor hosts (that includes hypervisor hosts 502 and 506), dedicated virtual desktops associated with virtual machines 504 and 508, and session shareable virtual desktop 510. Based on the similarity and compatibility pattern, placement analytics engine 224 places virtual machine 504 and associated dedicated virtual desktop in hypervisor host 502, virtual machine 508 and associated dedicated virtual desktop in hypervisor host 506, and the session shareable virtual desktop in a hypervisor host 512, which is a new hypervisor host that was not existing in the earlier arrangement.

Figure 6:
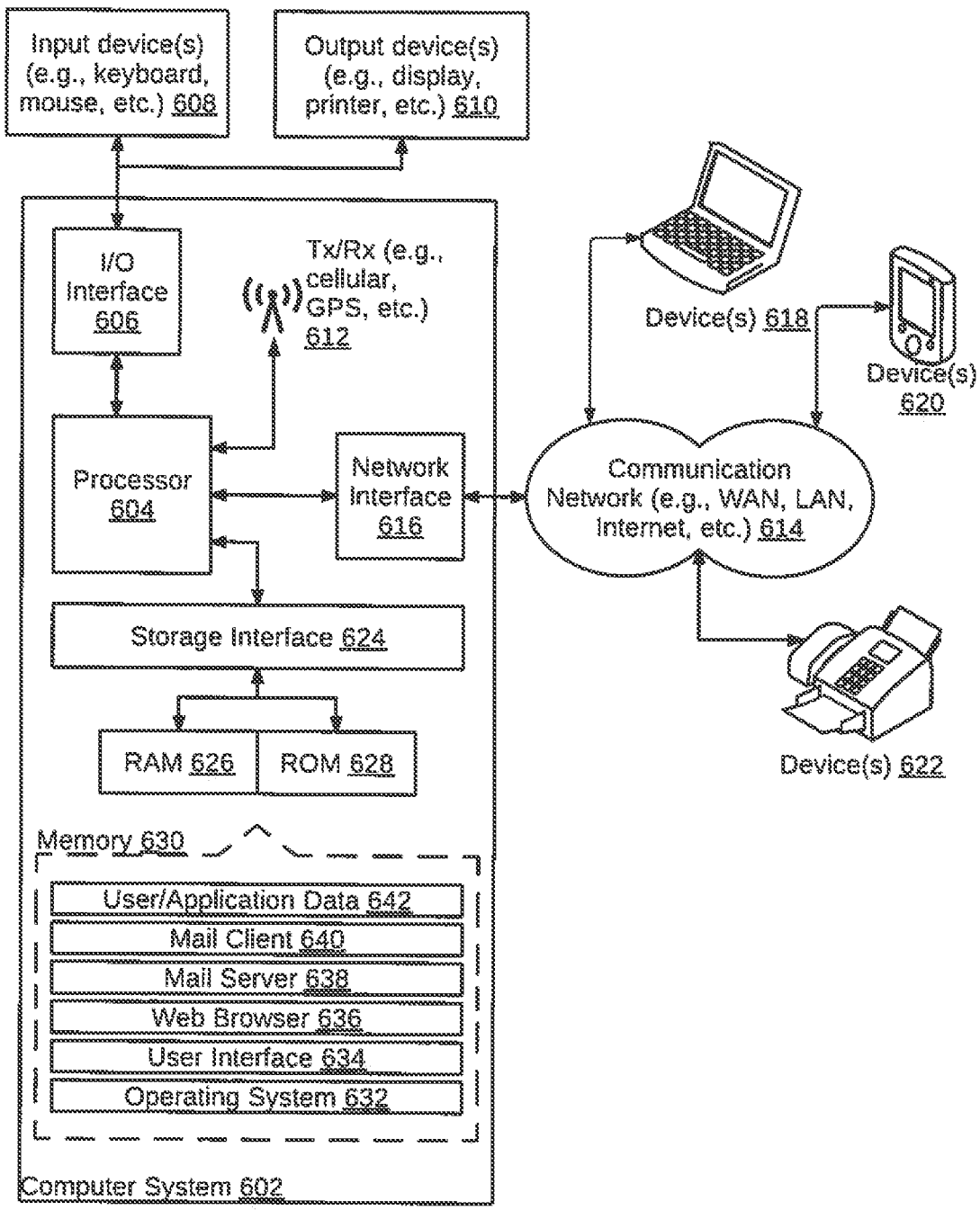
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair-SWQM-10/100/1000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, a user interface 634, a web browser 636, a mail server 638, a mail client 640, a user/application data 642 (e.g., any data variables or data records discussed in this disclosure), etc. Operating system 632 may facilitate resource management and operation of the computer system 602. Examples of operating system 632 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 602 may implement web browser 636 stored program component. Web browser 636 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 602 may implement mail server 638 stored program component. Mail server 638 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement mail client 640 stored program component. Mail client 640 may be a mail viewing application, such as Apple Mail, Microsoft Entourage, Microsoft Outlook, Mozilla Thunderbird, etc.

In some embodiments, computer system 602 may store user/application data 642, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be viewed as references to suitable means for providing the described functionality, rather than indicative of a strict logical or physical structure or organization.

Various embodiments provide method and system for managing user density at host server in virtual desktop infrastructure. As the common applications are shifted to session sharable virtual desktop (shared OS server), only dedicated or unique applications are left in user's dedicated virtual desktops images. A single application instance, installed on session sharable virtual desktop is shared by multiple users. Thus, the application memory, disk space as well the IOPS are consolidated. This leads to reduction in the total resources required by the site users. As the resource requirement are reduced considerably, more virtual desktops can be accommodated in the site without increasing the hypervisor host count, thereby increasing user density served by a hypervisor host. This further leads to reduction in number of hypervisor hosts, cost optimization due to reduced hardware and software license cost. Moreover, as the method is completely automated, it is very efficient and less cost intensive.

The specification has described method and system for managing user density at host server in virtual desktop infrastructure. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing user density in a virtual desktop infrastructure, the method comprising:
    installing, by a computing device, a plurality of virtual machine agents on a plurality of virtual machines and at least one hypervisor agent on at least one hypervisor host, wherein one of the plurality of virtual machine agents is installed on one of the plurality of virtual machines and one of the at least one hypervisor agent is installed on one of the at least one hypervisor host;
    configuring, by the computing device, each of the plurality of virtual machine agents and each of the at least one hypervisor agent to capture virtual machine management data from the plurality of virtual machines and the at least one hypervisor host, wherein the virtual machine management data comprises static information comprising application name, version, user specific customization, and application type and dynamic information comprising peak and average resource demands associated with at least one of applications installed on each of the plurality of virtual machines, users of the plurality of virtual machines, the at least one hypervisor host, or desktops associated with each of the plurality of virtual machines, and wherein the static information and the dynamic information are received based on one or more queries generated periodically based on the schedule received by a timer, and wherein the periodicity of the generation of the one or more queries is determined based on a data collection schedule;

analyzing, by the computing device, the virtual machine management data to determine a plurality of sets of common applications, wherein each set from the plurality of sets of common applications is common to two or more virtual machines within the plurality of virtual machines; and creating, by the computing device, a plurality of dedicated virtual desktops and a plurality of session sharable virtual desktops, wherein one of the plurality of sets of common applications is installed on one of the plurality of session sharable virtual desktops and at least one unique application is installed on one of the plurality of dedicated virtual desktops and wherein the plurality of session sharable desktops are created based on the dynamic information, wherein the creation is based on determination of similarity patterns and compatibility patterns existing between the at least one hypervisor host, the plurality of dedicated virtual desktops, and the plurality of session shareable virtual desktops to place the plurality of dedicated virtual desktops and the plurality of session shareable virtual desktops on the at least one hypervisor host, and wherein the plurality of virtual machines on the at least one hypervisor host are re-provisioned for reducing in per host user density in the virtual desktop infrastructure, based on the placing of the plurality of dedicated virtual desktops and the plurality of session shareable virtual desktops on the at least one hypervisor host.

2. The method of claim 1, wherein analyzing comprises extracting similarity patterns and compatibility patterns from the virtual machine management data to determine the plurality of sets of common applications.

3. The method of claim 2, wherein the similarity patterns and the compatibility patterns are extracted using a segmented search algorithm or a statistical classification algorithm.

4. The method of claim 1 further comprising placing at least one of the plurality of dedicated virtual desktops on one of the at least one hypervisor host based on the similarity patterns and the compatibility patterns.

5. The method of claim 1 further comprising placing one of the plurality of session shareable virtual desktops on one of the at least one hypervisor host based on the similarity patterns and the compatibility patterns.

6. The method of claim 1, wherein configuring comprises providing a virtual machine agent data collection template and schedule to a virtual machine agent and a hypervisor agent data collection template and schedule to a hypervisor agent in order to capture the virtual machine management data.

7. The method of claim 1 further comprising storing the virtual machine management data in a central master management unit.

8. A system for managing user density in a virtual desktop infrastructure, the system comprising:
a processor; and
a memory communicatively coupled to the processor, wherein the memory stores processor instructions, which, on execution, causes the processor to:

install a plurality of virtual machine agents on a plurality of virtual machines and at least one hypervisor agent on at least one hypervisor host, wherein one of the plurality of virtual machine agents is installed on one of the plurality of virtual machines and one of the at least one hypervisor agent is installed on one of the at least one hypervisor host;

configure each of the plurality of virtual machine agents and each of the at least one hypervisor agent to capture virtual machine management data from the plurality of virtual machines and the at least one hypervisor host, wherein the virtual machine management data comprises static information comprising application name, version, user specific customization, and application type and dynamic information comprising peak and average resource demands associated with at least one of applications installed on each of the plurality of virtual machines, users of the plurality of virtual machines, the at least one hypervisor host, or desktops associated with each of the plurality of virtual machines, and wherein the static information and the dynamic information are received based on one or more queries generated periodically based on the schedule received by a timer, and wherein the periodicity of the generation of the one or more queries is determined based on a data collection schedule;

analyze the virtual machine management data to determine a plurality of sets of common applications, wherein each set from the plurality of sets of common applications is common to two or more virtual machines within the plurality of virtual machines; and create a plurality of dedicated virtual desktops and a plurality of session sharable virtual desktops, wherein one of the plurality of sets of common applications is installed on one of the plurality of session sharable virtual desktops and at least one unique application is installed on one of the plurality of dedicated virtual desktops and wherein the plurality of session sharable desktops are created based on the dynamic information, wherein the creation is based on determination of similarity patterns and compatibility patterns existing between the at least one hypervisor host, the plurality of dedicated virtual desktops, and the plurality of session shareable virtual desktops to place the plurality of dedicated virtual desktops and the plurality of session shareable virtual desktops on the at least one hypervisor host, and wherein the plurality of virtual machines on the at least one hypervisor host are re-provisioned for reducing in per host user density in the virtual desktop infrastructure, based on the placing of the plurality of dedicated virtual desktops and the plurality of session shareable virtual desktops on the at least one hypervisor host.

9. The system of claim 8, wherein to analyze the processor instructions cause the processor to extract similarity patterns and compatibility patterns from the virtual machine management data to determine the plurality of sets of common applications.

10. The system of claim 9, wherein the similarity patterns and the compatibility patterns are extracted using a segmented search algorithm or a statistical classification algorithm.

11. The system of claim 8, wherein the processor instructions cause the processor to place at least one of the plurality of dedicated virtual desktops on one of the at least one hypervisor host based on the similarity patterns and the compatibility patterns.

12. The system of claim 8, wherein the processor instructions cause the processor to place one of the plurality of session shareable virtual desktops on one of the at least one hypervisor host based on the similarity patterns and the compatibility patterns.

13. The system of claim 8, wherein to configure the processor instructions cause the processor to provide a virtual machine agent data collection template and schedule to a virtual machine agent and a hypervisor agent data collection template and schedule to a hypervisor agent in order to capture the virtual machine management data.

14. The system of claim 8, wherein the processor instructions cause the processor to store the virtual machine management data in a central master management unit.

15. A non-transitory computer-readable storage medium having stored thereon, a set of computer-executable instructions for causing a computer comprising one or more processors to perform steps comprising:

installing, by a computing device, a plurality of virtual machine agents on a plurality of virtual machines and at least one hypervisor agent on at least one hypervisor host, wherein one of the plurality of virtual machine agents is installed on one of the plurality of virtual machines and one of the at least one hypervisor agent is installed on one of the at least one hypervisor host;

configuring, by the computing device, each of the plurality of virtual machine agents and each of the at least one hypervisor agent to capture virtual machine management data from the plurality of virtual machines and the at least one hypervisor host, wherein the virtual machine management data comprises static information comprising application name, version, user specific customization, and application type and dynamic information comprising peak and average resource demands associated with at least one of applications installed on each of the plurality of virtual machines, users of the plurality of virtual machines, the at least one hypervisor host, or desktops associated with each of the plurality of virtual machines, and wherein the static information and the dynamic information are received based on one or more queries generated periodically based on the schedule received by a timer, and wherein the periodicity of the generation of the one or more queries is determined based on a data collection schedule;

analyzing, by the computing device, the virtual machine management data to determine a plurality of sets of common applications, wherein each set from the plurality of sets of common applications is common to two or more virtual machines within the plurality of virtual machines; and creating, by the computing device, a plurality of dedicated virtual desktops and a plurality of session sharable virtual desktops, wherein one of the plurality of sets of common applications is installed on one of the plurality of session sharable virtual desktops and at least one unique application is installed on one of the plurality of dedicated virtual desktops and wherein the plurality of session sharable desktops are created based on the dynamic information, wherein the creation is based on determination of similarity patterns and compatibility patterns existing between the at least one hypervisor host, the plurality of dedicated virtual desktops, and the plurality of session shareable virtual desktops to place the Plurality of dedicated virtual desktops and the plurality of session shareable virtual desktops on the at least one hypervisor host, and wherein the plurality of virtual machines on the at least one hypervisor host are re-provisioned for reducing in per host user density in the virtual desktop infrastructure, based on the placing of the Plurality of dedicated virtual desktops and the plurality of session shareable virtual desktops on the at least one hypervisor host.

* * * * *